US011349714B1

(12) United States Patent
Phadte et al.

(10) Patent No.: US 11,349,714 B1
(45) Date of Patent: May 31, 2022

(54) COGNITIVE COMMAND LINE INTERFACE FOR CONFIGURING DEVICES

(71) Applicant: Kyndryl, Inc., New York, NY (US)

(72) Inventors: Pravin Bernard Phadte, Bengaluru (IN); Nedin Ametovski, Skopje (MK); Stephen O'Brien, Cork (IE); Saritha Route, Bengaluru (IN); Francesco Perillo, Velletri (IT)

(73) Assignee: Kyndryl, Inc., New York, NY (US)

( * ) Notice: Subject to any disclaimer, the term of this patent is extended or adjusted under 35 U.S.C. 154(b) by 21 days.

(21) Appl. No.: 17/143,259

(22) Filed: Jan. 7, 2021

(51) Int. Cl.
```
G06F 15/16      (2006.01)
H04L 41/08      (2022.01)
H04L 41/0813    (2022.01)
G06F 9/455      (2018.01)
H04L 9/40       (2022.01)
H04L 41/0893    (2022.01)
```

(52) U.S. Cl.
CPC ...... H04L 41/0886 (2013.01); G06F 9/45512 (2013.01); H04L 41/0813 (2013.01); H04L 41/0893 (2013.01); H04L 63/0876 (2013.01)

(58) Field of Classification Search
CPC ............ H04L 41/0886; H04L 41/0813; H04L 41/0893; H04L 63/0876; G06F 9/45512
See application file for complete search history.

(56) References Cited

U.S. PATENT DOCUMENTS

| | | | |
|---|---|---|---|
| 6,907,572 B2 | 6/2005 | Little et al. | |
| 7,113,989 B2 | 9/2006 | Murray et al. | |
| 7,401,086 B2 | 7/2008 | Chorafakis et al. | |
| 7,403,491 B2 * | 7/2008 | Zabihi | H04L 41/082 370/254 |
| 7,721,304 B2 * | 5/2010 | Datla | H04L 41/0266 706/21 |
| 9,043,252 B2 * | 5/2015 | Petrick | H04L 41/145 706/12 |
| 9,384,184 B2 | 7/2016 | Acuna et al. | |
| 9,419,842 B1 * | 8/2016 | Galliher, III | H04L 41/0893 |
| 9,621,420 B2 * | 4/2017 | Bradley | H04L 41/082 |
| 10,462,020 B2 | 10/2019 | Pathan | |
| 10,488,945 B2 * | 11/2019 | Fan | G06F 16/3331 |
| 10,586,173 B2 * | 3/2020 | Hammond | G06F 16/2228 |
| 11,128,700 B2 * | 9/2021 | Rao | H04L 67/1029 |
| 2006/0168158 A1 | 7/2006 | Das | |
| 2006/0190579 A1 * | 8/2006 | Rachniowski | H04L 41/0866 709/223 |

(Continued)

OTHER PUBLICATIONS

Hallie et al., Adata model for management of network device configuration heterogeneity, 2015 IFIP/IEEE International Symposium on Integrated Network Management (IM), 2015, pp. 1230-1233, doi: 10.1109/INM.2015.7140472. (Year: 2015).*

(Continued)

Primary Examiner — Nicholas R Taylor
Assistant Examiner — Thorne E Waugh
(74) Attorney, Agent, or Firm — Yee & Associates, P.C.

(57) ABSTRACT

Automatically providing CLI commands for configuring devices is provided. A set of CLI commands for configuring a device on a network is retrieved from a database using an artificial intelligence component based on model and operating system version of the device. The set of CLI commands for configuring the device is displayed within a summary window of a cognitive CLI. The set of CLI commands entered by a user while configuring the device is verified in real time on a CLI of the cognitive CLI using the artificial intelligence component.

19 Claims, 6 Drawing Sheets

(56) References Cited

U.S. PATENT DOCUMENTS

| | | | | |
|---|---|---|---|---|
| 2007/0103984 | A1* | 5/2007 | Kavuri | G06F 3/0631 |
| | | | | 365/185.17 |
| 2008/0005286 | A1* | 1/2008 | Short | H04L 41/0803 |
| | | | | 709/220 |
| 2010/0250196 | A1 | 9/2010 | Lawler et al. | |
| 2012/0192096 | A1* | 7/2012 | Bowman | G06F 3/04895 |
| | | | | 715/780 |
| 2016/0335319 | A1* | 11/2016 | Teodorescu | G06F 16/24553 |
| 2017/0235794 | A1* | 8/2017 | Wright | H04L 63/101 |
| | | | | 707/714 |

OTHER PUBLICATIONS

Martinez et al., Applying Information Extraction for Abstracting and Automating CLI-Based Configuration of Network Devices in Heterogeneous Environments, vol. 607, Springer, Cham, https://doi.org/10.1007/978-3-319-19833-0_8. (Year: 2015).*

Valencic et al., Implementation of NETCONF Protocol, May 1, 2019, IEEE, 2019 42nd International Convention on Information and Communication Technology, Electronics and Microelectronics (MIPRO) pp. 421-430. (Year: 2019).*

Anonymous, "AIX/LINUX command conversion bot," An IP.com Prior Art Database Technical Disclosure, IPCOM000236034D, Apr. 2, 2014, 8 pages. https://priorart.ip.com/IPCOM/000236034.

Anonymous, "CLI command completion helper," An IP.com Prior Art Database Technical Disclosure, IPCOM000216011D, Mar. 19, 2012, 5 pages. https://priorart.ip.com/IPCOM/000216011.

Geer, "Network automation scripts: Separating myth from reality," TechTarget, accessed Jan. 23, 2020, 7 pages. https://searchnetworking.techtarget.com/feature/Network-automation-scripts-Separating-myth-from-reality.

* cited by examiner

COGNITIVE COMMAND LINE INTERFACE FOR CONFIGURING DEVICES

BACKGROUND

1. Field

The disclosure relates generally to command line interfaces and more specifically to automatically providing a set of command line interface commands for configuring a managed device in a network to a user via a cognitive command line interface based on retrieved information from the managed device such as model and operating system version of the managed device.

2. Description of the Related Art

A command line interface (CLI) is a text-based interface used to operate software and operating systems while allowing the user to respond to command prompts by typing CLI commands into the CLI and receiving replies in the same way. Command prompts are used to notify the user that the CLI is ready to accept CLI commands. CLI commands are directives to software and operating systems to perform specific tasks. In other words, the CLI allows the user to perform a specific task by entering a specific CLI command in the CLI. After receiving a CLI command, the CLI processes the command and displays the output/result on the same screen. The program that handles the CLI is called a command line interpreter or command line processor. CLIs are often used by users, such as, for example, programmers and system administrators. CLI scripts are useful for specific tasks, such as, for example, configuring devices, adding new firewall policies, getting system information, and the like. In order to use a CLI properly, the user should know the appropriate CLI commands to enter into the CLI to perform desired tasks.

SUMMARY

According to one illustrative embodiment, a computer-implemented method for automatically providing CLI commands for configuring devices is provided. A computer, using an artificial intelligence component, retrieves a set of CLI commands for configuring a device on a network from a database of the computer based on model and operating system version of the device. The computer displays the set of CLI commands for configuring the device within a summary window of a cognitive CLI. The computer, using the artificial intelligence component, verifies the set of CLI commands entered by a user while configuring the device in real time on a CLI of the cognitive CLI. According to other illustrative embodiments, a computer system and computer program product for automatically providing CLI commands for configuring devices are provided.

DETAILED DESCRIPTION

Figure 1:
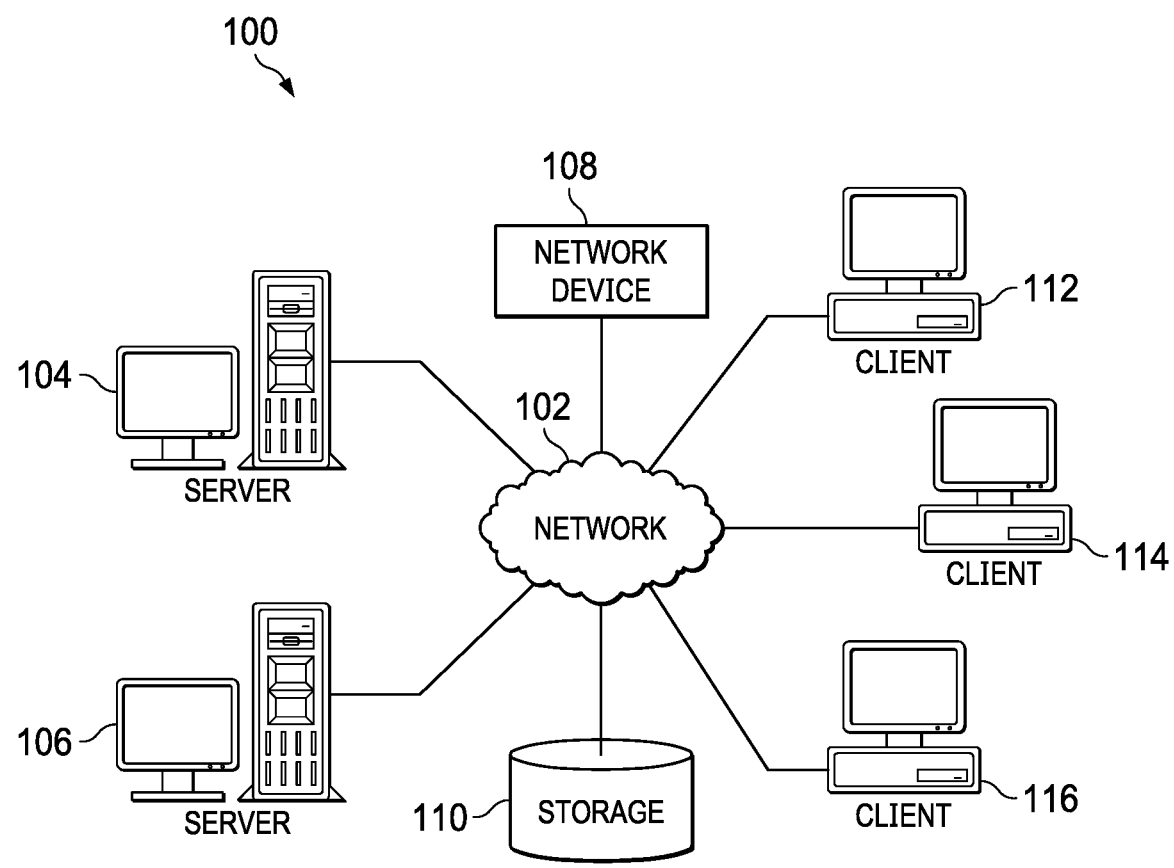
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, storage devices, and other network devices in which the illustrative embodiments may be implemented. Network data processing system 100 contains network 102, which is the medium used to provide communications links between the computers, data processing systems, storage devices, and other network devices connected together within network data processing system 100. Network 102 may include connections, such as, for example, wire communication links, wireless communication links, fiber optic cables, and the like.

In the depicted example, server 104 and server 106 connect to network 102, along with network device 108 and storage 110. Server 104 and server 106 may be, for example, server computers with high-speed connections to network 102. In addition, server 104 and server 106 may provide one or more services, such as, for example, data processing services, event monitoring services, financial services, banking services, governmental services, educational services, reservation services, search services, and the like. Also, it should be noted that server 104 and server 106 may each represent a cluster of servers in one or more data centers. Alternatively, server 104 and server 106 may each represent multiple computing nodes in one or more cloud environments.

Network device 108 may be, for example, a router, switch, firewall, or the like, which processes and routes traffic (e.g., data packets) in network 102. It should be noted that network device 108 may represent a plurality of network devices. Storage 110 is a data storage device capable of storing any type of data in a structured format or an unstructured format. In addition, storage 110 may represent a plurality of data storage devices, such as, for example, a redundant array of independent disks, a storage area network, or the like.

Client 112, client 114, and client 116 also connect to network 102. Clients 112, 114, and 116 are clients of server 104, server 106, network device 108, and storage 110. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart televisions, and the like, with wire or wireless communication links to network 102. Users of clients 112, 114, and 116 may utilize clients 112, 114, and 116 to access, configure, and manage server 104, server 106, network device 108, and storage 110 by entering corresponding CLI commands into a CLI of a cognitive CLI of illustrative embodiments displayed on a display device of clients 112, 114, and 116.

In addition, it should be noted that network data processing system 100 may include any number of additional server computers, network devices, storage devices, client devices, and other devices not shown. Program code located in network data processing system 100 may be stored on a computer readable storage medium or a set of computer readable storage media and downloaded to a computer or other data processing device for use. For example, program code may be stored on a computer readable storage medium on client 112 and downloaded to server 104 over network 102 for use on server 104.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
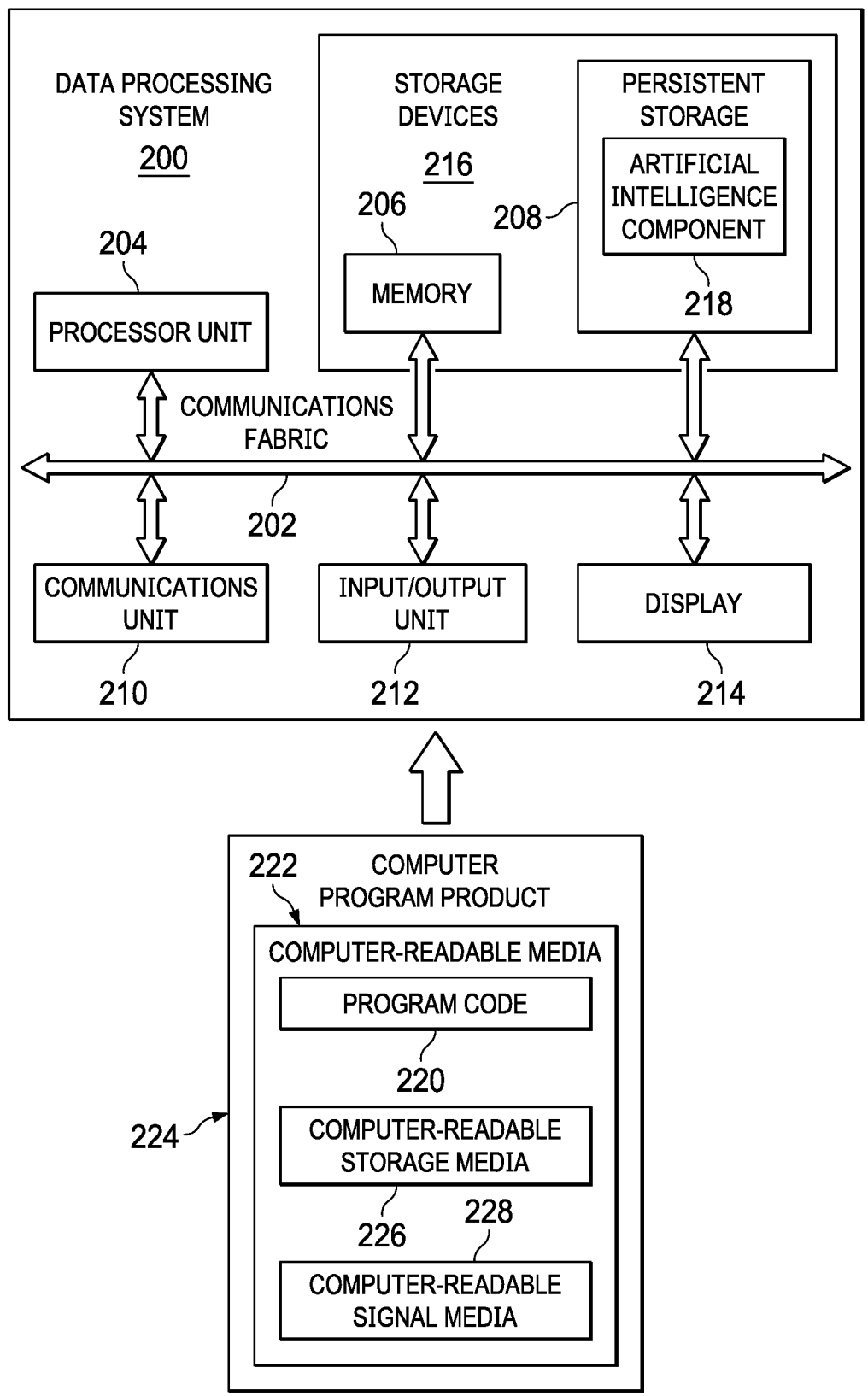
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer or other type of data processing system, such as client 112 in FIG. 1, in which computer readable program code or instructions implementing CLI command management processes of illustrative embodiments may be located. Data processing system 200 configures and manages a set of devices, such as, for example, server 104, server 106, network device 108, and storage 110 in FIG. 1, which are connected to a network, such as, for example, network 102 in FIG. 1, using CLI commands entered by a user within a cognitive CLI of illustrative embodiments displayed on display 214 of data processing system 200. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Furthermore, a computer readable storage device or a computer readable storage medium may represent a set of computer readable storage devices or a set of computer readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores artificial intelligence component 218. However, it should be noted that even though artificial intelligence component 218 is illustrated as residing in persistent storage 208, in an alternative illustrative embodiment artificial intelligence component 218 may be a separate component of data processing system 200. For example, artificial intelligence component 218 may be a hardware component coupled to communication fabric 202 or a combination of hardware and software components.

Artificial intelligence component 218 controls the process of automatically providing a set of CLI commands for configuring a managed device to a user via the cognitive CLI based on retrieved information from the managed device, such as, for example, device model, operating system version, vendor name, and the like, of the managed device. Artificial intelligence component 218 has intelligent behavior and can be based on the function of a human brain. Artificial intelligence component 218 comprises at least one of an artificial neural network, cognitive system, Bayesian network, fuzzy logic, expert system, natural language system, or some other suitable system. Machine learning can be used to train artificial intelligence component 218. Machine learning involves inputting data to the process and allowing the process to adjust and improve the function of artificial intelligence component 218, thereby increasing the predictive accuracy of artificial intelligence component 218 and, thus, increasing the performance of data processing system 200, itself.

A machine learning model of artificial intelligence component 218 can learn without being explicitly programmed to do so. The machine learning model can learn based on training data input into the machine learning model. The machine learning model can learn using various types of machine learning algorithms. The machine learning algorithms include at least one of a supervised learning, unsupervised learning, feature learning, sparse dictionary learning, anomaly detection, association rules, or other types of learning algorithms. Examples of machine learning models include an artificial neural network, a decision tree, a support vector machine, a Bayesian network, a genetic algorithm, and other types of models. These machine learning models can be trained using historical CLI commands for configuring a plurality of different managed devices, for example.

As a result, data processing system 200 operates as a special purpose computer system in which artificial intelligence component 218 in data processing system 200 enables automatic identification of a set of CLI commands for configuring a managed device based on model and operating system version of the managed device. In particular, artificial intelligence component 218 transforms data processing system 200 into a special purpose computer system as compared to currently available general computer systems that do not have artificial intelligence component 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Managed devices in an information technology infrastructure, such as, for example, network devices, data storage devices, computing devices, and the like, have a corresponding specific set of CLI commands for configuring each of these devices. The set of CLI commands corresponding to a particular device is defined based on model and operating system version of that particular device. As a result, with different vendors for a single device, variations in CLI commands for device configuration will exist for different models and operating system versions of that device. For example, a set of CLI commands for configuring a device can vary for a particular model and operating system version of that device per vendor. The intent of the vendors is the same, but the CLI commands for configuring that device change for each different instance. This presents a challenge for a user, such as a system administrator, who is knowledgeable regarding the technology (i.e., a particular device), but is unaware of the appropriate CLI commands to configure or troubleshoot that particular device.

Illustrative embodiments integrate a cognitive CLI with an artificial intelligence component and a database to learn and automatically provide CLI commands for configuring different devices to users via an extended CLI view or a web-based (e.g., Hypertext Markup Language) graphical user interface view. Upon a user logging in to a managed device using the cognitive CLI of illustrative embodiments, the cognitive CLI automatically detects the model and operating system version of that device and displays to the user the appropriate CLI commands to properly configure that device.

The cognitive CLI has a secure shell login to the device and has a cognitive capability of identifying the device logged in to. The cognitive CLI also displays a summary of the device's configuration if the device is listed in the database. In case this is a first-time login to the device, the cognitive CLI can request recording of the device configuration information in the database.

Illustrative embodiments enable storage of a plurality of different CLI commands for configuring a plurality of different devices and various other CLI commands in the database. The artificial intelligence component can filter the CLI commands for future use. When a user connects, via a secure shell, to a device using the cognitive CLI of illustrative embodiments, the cognitive CLI provides the user with a summary window where the user is able to review information regarding model and operating system version corresponding to that particular device. The summary window also provides the user with a set of CLI commands that the user can utilize to configure that particular device. Moreover, illustrative embodiments are capable of automatically configuring a managed device based on illustrative embodiments automatically entering the set of CLI commands for that particular device into the cognitive CLI.

Thus, illustrative embodiments are capable of automatically providing a set of CLI commands for a particular network device based on an artificial intelligence component learning CLI commands for configuring different devices available in the database. As a result, illustrative embodiments are capable of providing a set of CLI commands for configuring a particular device without human intervention. In addition, the database continues to grow over time and, therefore, the artificial intelligence component continues to learn more CLI commands for configuring different devices as the database continues to grow. Further, illustrative embodiments are capable of providing CLI commands regardless of different hardware and software vendors corresponding to a device. Furthermore, illustrative embodiments enable side-by-side reference of CLI command lines with device configurations in the summary window. Consequently, illustrative embodiments are capable of increasing service delivery to customers. Moreover, illustrative embodiments decrease user time to upskill on CLI commands, which are unfamiliar to a user, to configure devices.

Thus, illustrative embodiments provide one or more technical solutions that overcome a technical problem with configuring devices using CLI commands. As a result, these one or more technical solutions provide a technical effect and practical application in the field of command line interfaces.

Figure 3:
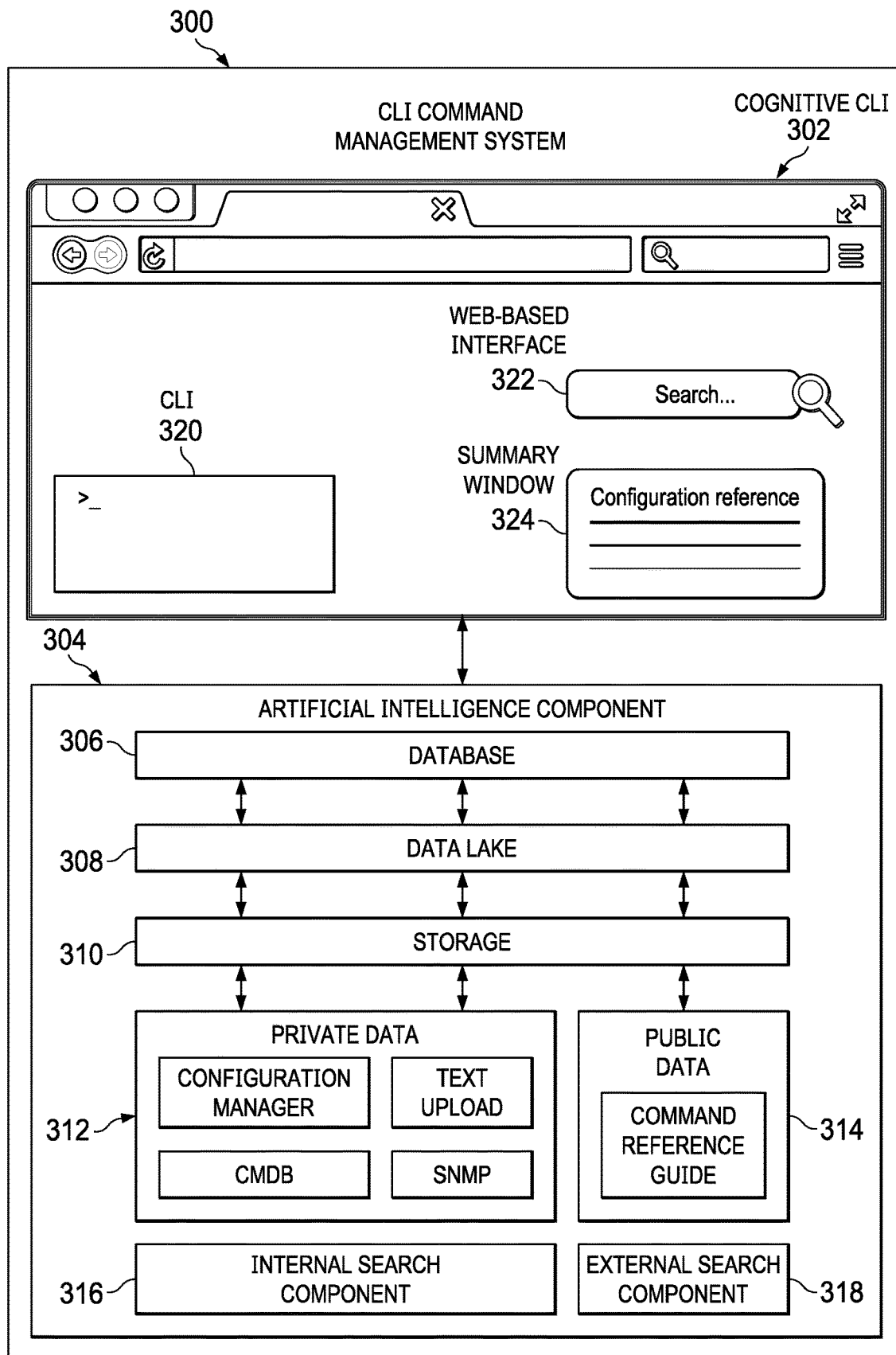
FIG. 3 is a diagram illustrating an example of a CLI command management system in accordance with an illustrative embodiment.

With reference now to FIG. 3, a diagram illustrating an example of a CLI command management system is depicted in accordance with an illustrative embodiment. CLI command management system 300 may be implemented in a computer or other type of data processing system, such as, for example, client 112 in FIG. 1 or data processing system 200 in FIG. 2. CLI command management system 300 is a system of hardware and software components for automatically providing a set of CLI commands for configuring a managed device to a user via cognitive CLI 302 based on retrieved information from the managed device (e.g., device model and operating system version of the managed device). The managed device may be, for example, a computing device, a network device, or a storage device, such as server 104, network device 108, or storage 110 in FIG. 1.

In this example, CLI command management system 300 includes cognitive CLI 302, artificial intelligence component 304, database 306, data lake 308, storage 310, private data 312, public data 314, internal search component 316, and external search component 318. However, it should be noted that CLI command management system 300 is intended as an example only and not as a limitation on illustrative embodiments. In other words, CLI command management system 300 may include more or fewer components than illustrated. For example, one component may be split into two or more components, two or more components may be combined into one component, a component shown may be removed, a component not shown may be added, and the like.

Cognitive CLI 302 is a user interface that integrates CLI 320 and web-based interface 322 (i.e., an HTML interface). Cognitive CLI 302 enables secure shell and telnet communication with web-based interface 322 for application programming interface calls to CLI commands for configuring devices. CLI 320 is a command line input component, which processes data to web-based interface 322. Web-based interface 322 validates the data received from CLI 320 and uses the data to search for CLI commands corresponding to different device configurations. Web-based interface 322 outputs a reference set of CLI commands for configuring a managed device in summary window 324.

Artificial intelligence component 304 may be, for example, artificial intelligence component 218 in FIG. 2. Artificial intelligence component 304 receives requests for CLI commands to configure particular devices from CLI 320. Artificial intelligence component 304 processes the requests and utilizes the requests to search database 306 for corresponding CLI commands. Artificial intelligence component 304 learns CLI commands for configuring different devices and provides the appropriate set of CLI commands to configure a particular device as output to a user via summary window 324 of cognitive CLI 302.

Database 306 retrieves a set of data to be forwarded to data lake 308 based on a request for CLI commands to configure a device received from artificial intelligence component 304. Database 306 utilizes data lake 308 to process related information on the requested CLI commands. Data lake 308 utilizes tags (e.g., data labels) and keywords to process the CLI command requests quickly. Keywords may include, for example, device name, device model, device operating system version, one or more CLI commands, and the like.

Storage 310 may be, for example, persistent storage 208 in FIG. 2. Storage 310 stores inputs corresponding to different sets of CLI commands for configuring different devices. Various inputs may include, for example, plain text input manually by a system administrator regarding different CLI commands for configuring different devices or CLI commands for configuring different devices automatically input by a network management tool, such as, for example, a network management system, which captures such information. A network management system (NMS) is an application or set of applications that enables a network administrator to manage a network's independent components. NMS may be used to monitor both software and hardware components in the network.

Private data 312 represent internal information of an entity, such as, for example, an enterprise, company, business, organization, or the like, which can be associated with information related to information technology service management and monitoring. Private data 312 may include, for example, uploaded device configuration data in plain text, configuration manager information, configuration management database (CMDB) information regarding hardware and software assets, simple network management protocol (SNMP) information regarding managed devices on the network, and the like. In other words, private data 312 contain information regarding specific CLI commands for configuring particular managed devices on the network.

Public data 314 represent external information uploaded from different remote data sources, such as, for example, different vendor databases in the public domain, regarding reference, example, or template CLI commands for configuring devices. Public data 314 may include, for example, device command line reference guides, device quick start guides, device installation guides, and the like from a plurality of different vendors corresponding to different models and operating system versions of different devices.

Internal search component 316 may utilize, for example, a set of bots, to crawl database 306 for specific CLI commands for configuring a particular device based on information or keywords, such as, for example, device name, device vendor, device model, device operating system version, and the like. External search component 316 utilizes appropriate application programming interfaces to crawl remote vendor databases for information regarding reference CLI commands corresponding to different device models and operating system versions to update database 306 with that information.

Figure 4:
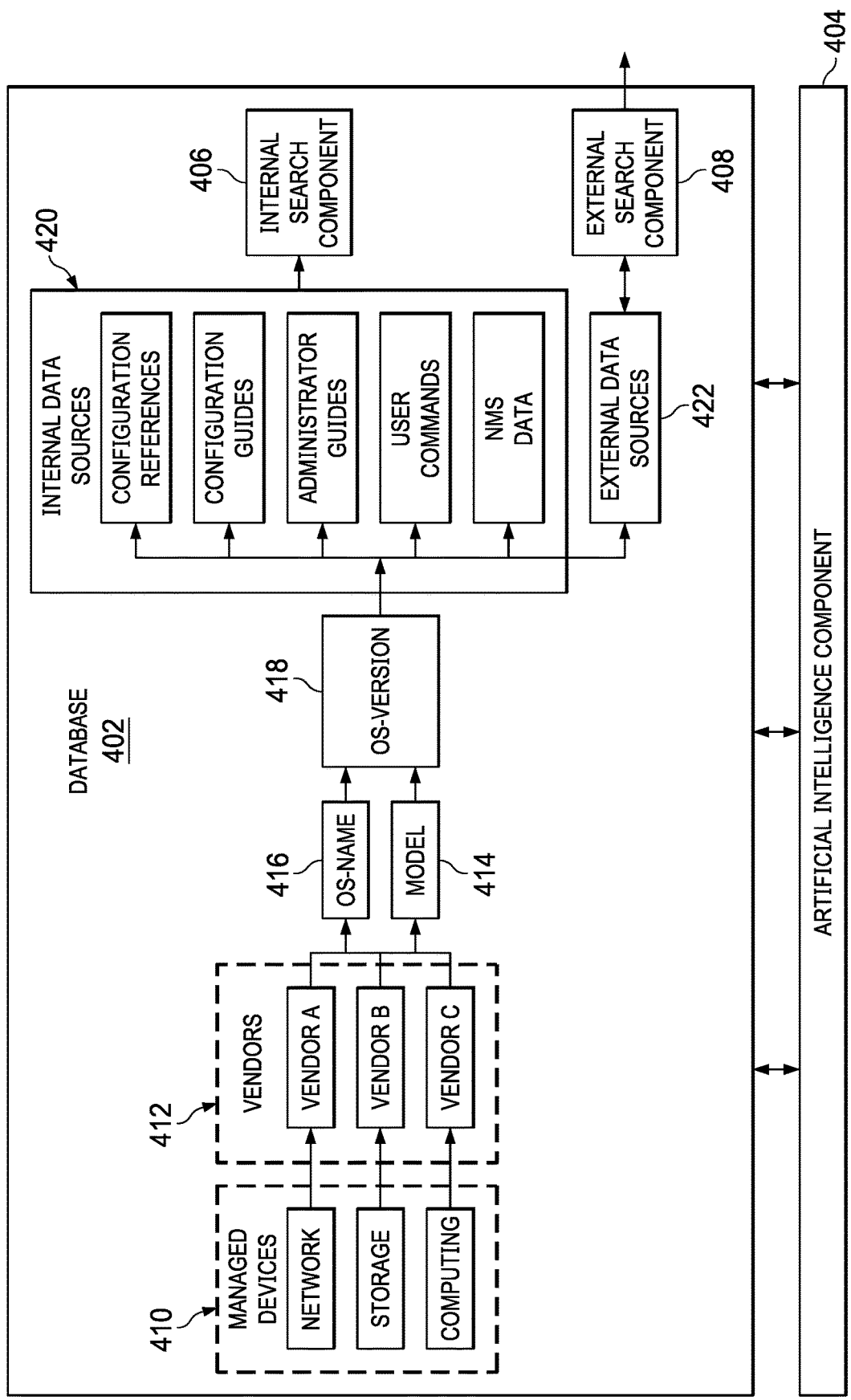
FIG. 4 is a diagram illustrating an example of a database flow in accordance with an illustrative embodiment.

With reference now to FIG. 4, a diagram illustrating an example of a database flow is depicted in accordance with an illustrative embodiment. Database flow 400 is implemented in database 402, such as, for example, database 306 in FIG. 3. Database flow 400 provides an overview of how information is organized in database 402 for artificial intelligence component 404, internal search component 406, and external search component 408 to function properly. Artificial intelligence component 404, internal search component 406, and external search component 408 may be, for example, artificial intelligence component 304, internal search component 316, and external search component 318 in FIG. 3.

Artificial intelligence component 404 synchronizes, matches, and aligns the information contained within database 402 based on model and operating system version of each particular managed device on a network, such as, for example, network 102 in FIG. 1. Artificial intelligence component 404 also evaluates aspects of command lines with reference to device configuration sets, problem solving, and troubleshooting command lines.

Artificial intelligence component 404 understands the managed device logged in to by a user via a cognitive CLI, such as, for example, cognitive CLI 302 in FIG. 3, its hardware model and operating system version, which artificial intelligence component 404 uses to match information in database 402 (i.e., corresponding CLI commands for configuring that device). In other words, artificial intelligence component 404 provides the CLI commands that best match the managed device logged in to by the user via the cognitive CLI.

Furthermore, artificial intelligence component 404 is able to verify the CLI commands as the user is typing the CLI commands in real time on a CLI, such as, for example, CLI 320 in FIG. 3, of the cognitive CLI. In other words, artificial intelligence component 404 can detect any typographical or other entry errors entered by the user on the CLI in real time and provide the correct CLI command to the user while configuring the managed device. Artificial intelligence component 404 uses knowledge of the devices, vendors, and curated intents to provide the right recommendations in real time.

In this example, database flow 400 begins with managed devices 410 (e.g., network, storage, and computing devices), which is further divided by vendors 412 (e.g., vendor A, vendor B, and vendor C). Each vendor of vendors 412 provides model 414 and operating system name 416 for corresponding managed devices 410. However, it should be noted that different vendors can have overlapping operating system names for same or similar managed devices 410. Further, operating system name 416 can be used to identify operating system version 418 regardless of the managed device.

Internal data sources 420 are input to database 402 by a system administrator. In this example, internal data sources 420 include configuration references, configuration guides, administrator guides, user commands, and NMS data that records device configuration information. External data sources 422 are also input to database 402. External data sources 422 identify remote sources of information, such as, for example, vendor databases containing device configuration information and reference CLI commands for configuring those devices. External search component 408 utilizes identification of external data sources 422 to crawl vendor data via the Internet.

Figure 5A:
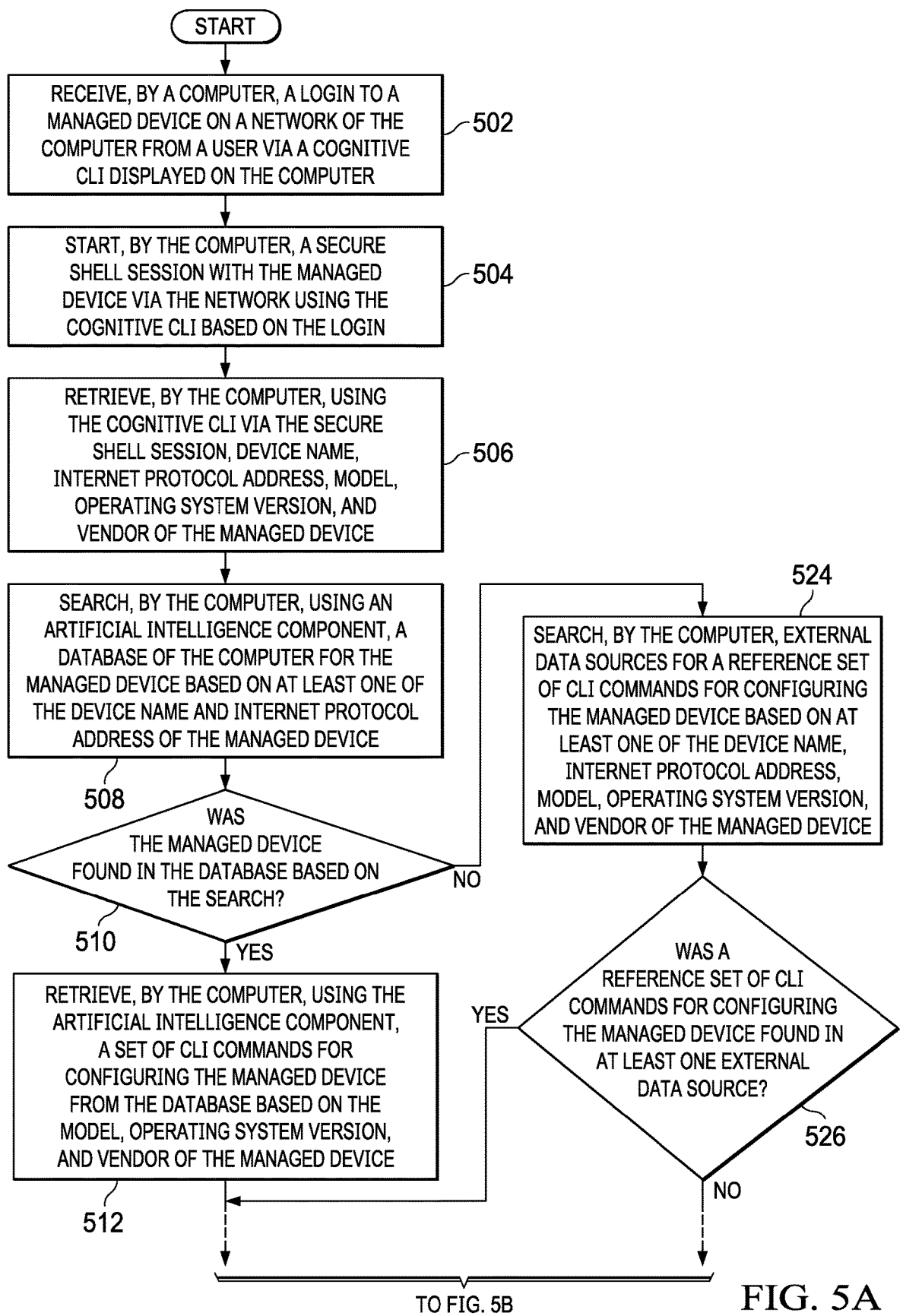
FIGS. 5A-5B are a flowchart illustrating a process for automatically providing a set of CLI commands for configuring a managed device in accordance with an illustrative embodiment.
Figure 5B:
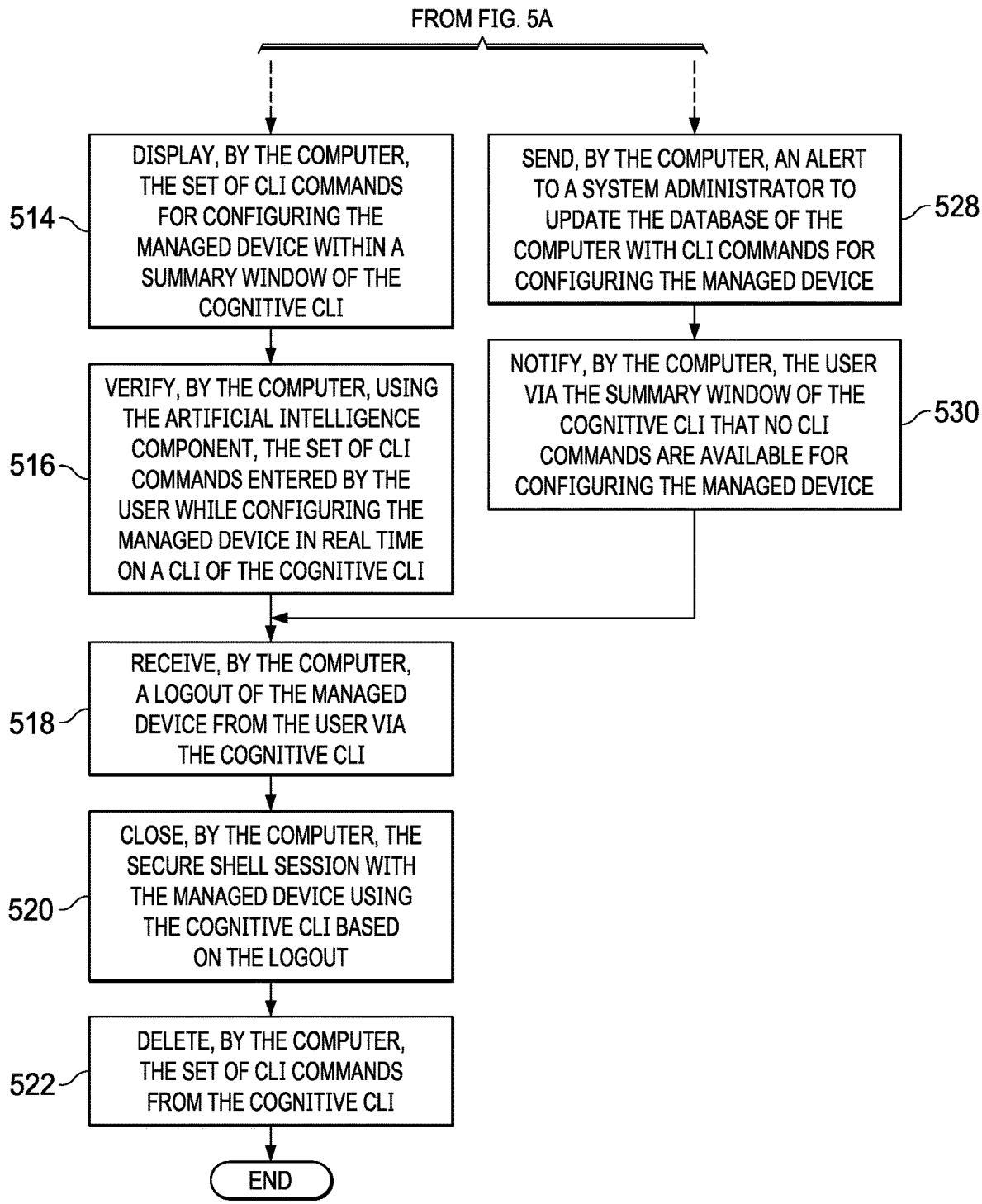

With reference now to FIGS. 5A-5B, a flowchart illustrating a process for automatically providing a set of CLI commands for configuring a managed device is shown in accordance with an illustrative embodiment. The process shown in FIGS. 5A-5B may be implemented in a computer, such as, for example, client 112 in FIG. 1 or data processing system 200 in FIG. 2.

The process begins when the computer receives a login to a managed device on a network of the computer from a user via a cognitive CLI displayed on a display of the computer (step 502). The computer starts a secure shell session with the managed device via the network using the cognitive CLI based on the login (step 504). In addition, the computer, using the cognitive CLI via the secure shell session with the managed device, retrieves device name, internet protocol address, model, operating system version, and vendor of the managed device (step 506).

Subsequent to retrieving the information from the managed device via the secure shell session, the computer, using an artificial intelligence component, searches a database of the computer for the managed device based on at least one of the device name and internet protocol address of the managed device (step 508). Afterward, the computer makes a determination as to whether the managed device was found in the database based on the search (step 510). If the computer determines that the managed device was found in the database based on the search, yes output of step 510, then the computer, using the artificial intelligence component, retrieves a set of CLI commands for configuring the managed device from the database based on the model, operating system version, and vendor of the managed device (step 512). Further, the computer displays the set of CLI commands for configuring the managed device within a summary window of the cognitive CLI (step 514).

Furthermore, the computer, using the artificial intelligence component, verifies the set of CLI commands entered by the user while configuring the managed device in real time on a CLI of the cognitive CLI (step 516). For example, the artificial intelligence component detects any typographical or other entry errors made by the user while entering the set of CLI commands in the CLI to configure the managed device and provides a correct CLI command or a correct sequence of CLI commands to the user via the summary window of the cognitive CLI.

Subsequently, the computer receives a logout of the managed device from the user via the cognitive CLI (step 518). The computer closes the secure shell session with the managed device using the cognitive CLI based on the logout (step 520). Moreover, the computer deletes the set of CLI commands from a temporary memory of the cognitive CLI (step 522).

Returning again to step 510, if the computer determines that the managed device was not found in the database based on the search, no output of step 510, then the computer searches external data sources for a reference set of CLI commands for configuring the managed device based on at least one of the device name, internet protocol address, model, operating system version, and vendor of the managed device (step 524). After searching the external data sources, the computer makes a determination as to whether a reference set of CLI commands for configuring the managed device was found in at least one external data source (step 526).

If the computer determines that a reference set of CLI commands for configuring the managed device was found in at least one external data source, yes output of step 526, then the process returns to step 514 where the computer displays the reference set of CLI commands within the summary window to the user. If the computer determines that a reference set of CLI commands for configuring the managed device was not found in at least one external data source, no output of step 526, then the computer sends an alert to a system administrator to update the database of the computer with CLI commands for configuring the managed device (step 528). The computer also notifies the user via the summary window of the cognitive CLI that no CLI commands are available for configuring the managed device in the database of the computer or the external data sources (step 530). Thereafter, the process returns to step 518 where the computer receives a logout of the managed device from the user via the cognitive CLI.

Thus, illustrative embodiments of the present invention provide a computer-implemented method, computer system, and computer program product for automatically providing a set of command line interface commands for configuring a managed device in a network to a user via a cognitive command line interface based on retrieved information from the managed device such as model and operating system version of the managed device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically providing command line interface (CLI) commands for configuring devices, the computer-implemented method comprising:
    training, by a computer, a machine learning model of an artificial intelligence component using historical CLI commands for configuring a plurality of different devices to form a trained artificial intelligence component;
    retrieving, by the computer using the trained artificial intelligence component, a set of CLI commands for configuring a device on a network from a database of the computer based on model and operating system version of the device;
    displaying, by the computer, the set of CLI commands for configuring the device within a summary window of a cognitive CLI; and
    verifying, by the computer using the trained artificial intelligence component, the set of CLI commands entered by a user while configuring the device in real time on a CLI of the cognitive CLI, wherein the trained artificial intelligence component detects typographical errors made by the user while entering the set of CLI commands in the CLI to configure the device and provides a correct CLI command or a correct sequence of CLI commands to the user while configuring the device via the summary window of the cognitive CLI in response to detecting the typographical errors.

2. The computer-implemented method of claim 1, further comprising:
    receiving, by the computer, a login to the device from the user via the cognitive CLI displayed on a display of the computer;
    starting, by the computer, a secure shell session with the device via the network using the cognitive CLI based on the login; and
    retrieving, by the computer using the cognitive CLI via the secure shell session with the device, device name, internet protocol address, model, and operating system version of the device.

3. The computer-implemented method of claim 2, further comprising:
    searching, by the computer using the trained artificial intelligence component, the database of the computer for the device based on at least one of the device name and the internet protocol address of the device.

4. The computer-implemented method of claim 3, further comprising:
    retrieving, by the computer using the trained artificial intelligence component, the set of CLI commands for configuring the device from the database of the computer based on the model and the operating system version of the device in response to the computer determining that the device was found in the database based on the searching.

5. The computer-implemented method of claim 3, further comprising:

searching, by the computer, external data sources for a reference set of CLI commands for configuring the device based on at least one of the device name, the internet protocol address, the model, and the operating system version of the device in response to the computer determining that the device was not found in the database of the computer based on the searching;

determining, by the computer, whether a reference set of CLI commands for configuring the device was found in at least one external data source; and displaying, by the computer, the reference set of CLI commands within the summary window of the cognitive CLI to the user in response to the computer determining that the reference set of CLI commands for configuring the device was found in at least one external data source.

6. The computer-implemented method of claim 5, further comprising:

sending, by the computer, an alert to a system administrator to update the database of the computer with CLI commands for configuring the device and notifying, by the computer, the user via the summary window of the cognitive CLI that no CLI commands are available for configuring the device in the database of the computer or the external data sources in response to the computer determining that a reference set of CLI commands for configuring the device was not found in at least one external data source.

7. The computer-implemented method of claim 2, further comprising:

receiving, by the computer, a logout of the device from the user via the cognitive CLI;

closing, by the computer, the secure shell session with the device using the cognitive CLI based on the logout; and deleting, by the computer, the set of CLI commands from a temporary memory of the cognitive CLI.

8. The computer-implemented method of claim 1, wherein the device is one of a computing device, a storage device, or a network device connected to the network of the computer.

9. The computer-implemented method of claim 1, wherein the cognitive CLI includes the summary window, the CLI, and a web-based interface, and wherein the web-based interface uses data received from the CLI to search for a reference set of CLI commands for configuring the device.

10. A computer system for automatically providing command line interface (CLI) for configuring devices, the computer system comprising:

a bus system;

a storage device connected to the bus system, wherein the storage device stores program instructions; and a processor connected to the bus system, wherein the processor executes the program instructions to:

train a machine learning model of an artificial intelligence component using historical CLI commands for configuring a plurality of different devices to form a trained artificial intelligence component;

retrieve, using the trained artificial intelligence component, a set of CLI commands for configuring a device on a network from a database of the computer system based on model and operating system version of the device;

display the set of CLI commands for configuring the device within a summary window of a cognitive CLI; and verify, using the trained artificial intelligence component, the set of CLI commands entered by a user while configuring the device in real time on a CLI of the cognitive CLI, wherein the trained artificial intelligence component detects typographical errors made by the user while entering the set of CLI commands in the CLI to configure the device and provides a correct CLI command or a correct sequence of CLI commands to the user while configuring the device via the summary window of the cognitive CLI in response to detecting the typographical errors.

11. The computer system of claim 10, wherein the processor further executes the program instructions to:

receive a login to the device from the user via the cognitive CLI displayed on a display of the computer system;

start a secure shell session with the device via the network using the cognitive CLI based on the login; and retrieve, using the cognitive CLI via the secure shell session with the device, device name, internet protocol address, model, and operating system version of the device.

12. The computer system of claim 11, wherein the processor further executes the program instructions to:

search, using the trained artificial intelligence component, the database of the computer system for the device based on at least one of the device name and the internet protocol address of the device.

13. The computer system of claim 12, wherein the processor further executes the program instructions to:

retrieve, using the trained artificial intelligence component, the set of CLI commands for configuring the device from the database of the computer system based on the model and the operating system version of the device in response to determining that the device was found in the database based on the search.

14. The computer system of claim 12, wherein the processor further executes the program instructions to:

search external data sources for a reference set of CLI commands for configuring the device based on at least one of the device name, the internet protocol address, the model, and the operating system version of the device in response to determining that the device was not found in the database of the computer system based on the search;

determine whether a reference set of CLI commands for configuring the device was found in at least one external data source; and display the reference set of CLI commands within the summary window of the cognitive CLI to the user in response to determining that the reference set of CLI commands for configuring the device was found in at least one external data source.

15. A computer program product for automatically providing command line interface (CLI) commands for configuring devices, the computer program product comprising a computer readable storage medium having program instructions embodied therewith, the program instructions executable by a computer to cause the computer to perform a method of:

training, by the computer, a machine learning model of an artificial intelligence component using historical CLI commands for configuring a plurality of different devices to form a trained artificial intelligence component;

retrieving, by the computer using the trained artificial intelligence component, a set of CLI commands for configuring a device on a network from a database of the computer based on model and operating system version of the device;

displaying, by the computer, the set of CLI commands for configuring the device within a summary window of a cognitive CLI; and verifying, by the computer using the trained artificial intelligence component, the set of CLI commands entered by a user while configuring the device in real time on a CLI of the cognitive CLI, wherein the trained artificial intelligence component detects typographical errors made by the user while entering the set of CLI commands in the CLI to configure the device and provides a correct CLI command or a correct sequence of CLI commands to the user while configuring the device via the summary window of the cognitive CLI in response to detecting the typographical errors.

16. The computer program product of claim 15, further comprising:

receiving, by the computer, a login to the device from the user via the cognitive CLI displayed on a display of the computer;

starting, by the computer, a secure shell session with the device via the network using the cognitive CLI based on the login; and retrieving, by the computer, using the cognitive CLI via the secure shell session with the device, device name, internet protocol address, model, and operating system version of the device.

17. The computer program product of claim 16, further comprising:

searching, by the computer using the trained artificial intelligence component, the database of the computer for the device based on at least one of the device name and the internet protocol address of the device.

18. The computer program product of claim 17, further comprising:

retrieving, by the computer using the trained artificial intelligence component, the set of CLI commands for configuring the device from the database of the computer based on the model and the operating system version of the device in response to the computer determining that the device was found in the database based on the searching.

19. The computer program product of claim 17, further comprising:

searching, by the computer, external data sources for a reference set of CLI commands for configuring the device based on at least one of the device name, the internet protocol address, the model, and the operating system version of the device in response to the computer determining that the device was not found in the database of the computer based on the searching;

determining, by the computer, whether a reference set of CLI commands for configuring the device was found in at least one external data source; and displaying, by the computer, the reference set of CLI commands within the summary window of the cognitive CLI to the user in response to the computer determining that the reference set of CLI commands for configuring the device was found in at least one external data source.

* * * * *